United States Patent
Bergou et al.

(10) Patent No.: US 9,083,918 B2
(45) Date of Patent: Jul. 14, 2015

(54) PALETTE-BASED IMAGE EDITING

(75) Inventors: Miklos J. Bergou, New York, NY (US); Fang Da, New York, NY (US)

(73) Assignee: Adobe Systems Incorporated, San Jose, CA (US)

( * ) Notice: Subject to any disclaimer, the term of this patent is extended or adjusted under 35 U.S.C. 154(b) by 207 days.

(21) Appl. No.: 13/476,842

(22) Filed: May 21, 2012

(65) Prior Publication Data
US 2013/0050238 A1 Feb. 28, 2013

Related U.S. Application Data

(60) Provisional application No. 61/528,045, filed on Aug. 26, 2011.

(51) Int. Cl.
| | |
|---|---|
| H04N 1/46 | (2006.01) |
| H04N 1/62 | (2006.01) |
| G06T 5/40 | (2006.01) |
| G06T 19/20 | (2011.01) |
| G06K 9/62 | (2006.01) |
| G09G 5/06 | (2006.01) |
| G06T 5/50 | (2006.01) |

(52) U.S. Cl.
CPC ............... *H04N 1/46* (2013.01); *G06K 9/6218* (2013.01); *G06T 5/40* (2013.01); *G06T 5/50* (2013.01); *G06T 19/20* (2013.01); *H04N 1/62* (2013.01); *G09G 5/06* (2013.01)

(58) Field of Classification Search
None
See application file for complete search history.

(56) References Cited

U.S. PATENT DOCUMENTS

| | | | |
|---|---|---|---|
| 2002/0130884 A1* | 9/2002 | Rose | 345/594 |
| 2004/0081345 A1* | 4/2004 | Douglass | 382/133 |
| 2009/0097746 A1* | 4/2009 | Shinjo et al. | 382/168 |
| 2010/0172576 A1* | 7/2010 | Goldfarb et al. | 382/164 |
| 2012/0075329 A1* | 3/2012 | Skaff et al. | 345/593 |

OTHER PUBLICATIONS

Xuezhong Xiao et al, Color Transfer in Correlated Color Space, 2006, ACM.*
Dong et al, Color Clustering and Learning for Image Segmentation Based on Neural Networks, 2005, IEEE.*

* cited by examiner

*Primary Examiner* — Carlos Perromat
*Assistant Examiner* — Xin Sheng
(74) *Attorney, Agent, or Firm* — Wolfe-SBMC

(57) ABSTRACT

Methods, apparatus, and non-transitory computer-readable storage media for editing the colors of objects or regions in digital images. A method for editing images using a color palette is provided. A color palette is described that may be suitable for editing images, which may include specified objects or regions in images. The color palette may display image-specific colors identified using image-dependent techniques described herein. These color palettes may also modify the colors in the image corresponding to the displayed colors in the color palette interface. The method may implement structure-preserving techniques that preserve the structure of the color histogram of the image, thus preserving the natural look of the original image.

16 Claims, 8 Drawing Sheets

PALETTE-BASED IMAGE EDITING

PRIORITY INFORMATION

This application claims benefit of priority of U.S. Provisional Appl. No. 61/528,045, filed Aug. 26, 2011, which is hereby incorporated by reference in its entirety.

BACKGROUND

Description of the Related Art

Image editing often involves manipulations such as changing the saturation, hue, or tone of certain colors to achieve various artistic effects. In one conventional approach, users manipulate a curve mapping of image tonality. By changing the curve, a user may manipulate the overall tone of an image or individual colors by increasing or decreasing the values associated with a color. Another conventional approach to achieving these effects is to give users control over a color palette that includes a standard set of colors such as "red," "blue," "green," and "yellow," and to map any changes to the color palette back to the pixels of the image. This palette is generally static and independent of the colors in the image being edited; in other words, the colors presented by these conventional palettes as defaults are standard colors. However, the actual colors found in the image are generally some combination of colors. To modify a color in a portion of the image, the user may generally have to modify two or more of the colors presented by the palette in an attempt to achieve a desired result in the target portion of the image.

SUMMARY

Various embodiments of methods, apparatus, and non-transitory computer-readable storage media for editing images using color palettes are described. Several embodiments of color palettes are described that may be suitable for editing images, which may include specified objects or regions in images. These color palettes may display image-specific colors identified using image-dependent techniques described herein. These color palette interfaces may also modify the colors in the image corresponding to the displayed colors in the color palette. The identified colors displayed by the color palette may be different than conventional color palette used to edit digital images, which rely upon a predetermined set of standard colors that are image-independent. In addition, because these image-specific colors using image-dependent techniques are displayed, the user may directly modify colors present in the image to achieve an editing effect rather than modifying a combination of the predetermined, image-independent colors displayed in a conventional color palette. The method may implement structure-preserving techniques that preserve the structure of the color histogram of the image, thus preserving the natural look of the original image.

In at least some embodiments of a method for editing images using color palettes, a color clustering technique is performed on a target image, which may also include a specified object or region of the image, to identify the colors displayed in the target image's corresponding color palette interface. A color clustering technique decomposes the image into clusters of pixels based on color according to a three-dimensional (3D) color histogram of the pixels in an input image. By using a color clustering technique, the identified colors displayed in the color palette interfaces are image-specific.

In certain embodiments, a color clustering technique identifies one or more rays emanating from the origin of the 3D color histogram and passing through clusters of pixels. In response to a modification on the color palette interface, a ray, and the corresponding cluster of pixels, may be rotated in the 3D color histogram. In some embodiments a structure-preserving editing technique preserves the structure of the clusters corresponding to a ray and the origin of the 3D color histogram.

In various embodiments, the color palette is displayed on a user interface. A user may edit the palette, for example by manipulating one or more user interface elements such as slider bars. In some embodiments, the user interface to the color palette may be interactive so that the user may, for example, specify the number of colors to be identified and included in the palette, specify a particular color to be represented in the palette, and/or request that new clusters be identified to thus update the displayed color palette.

Figure 1:
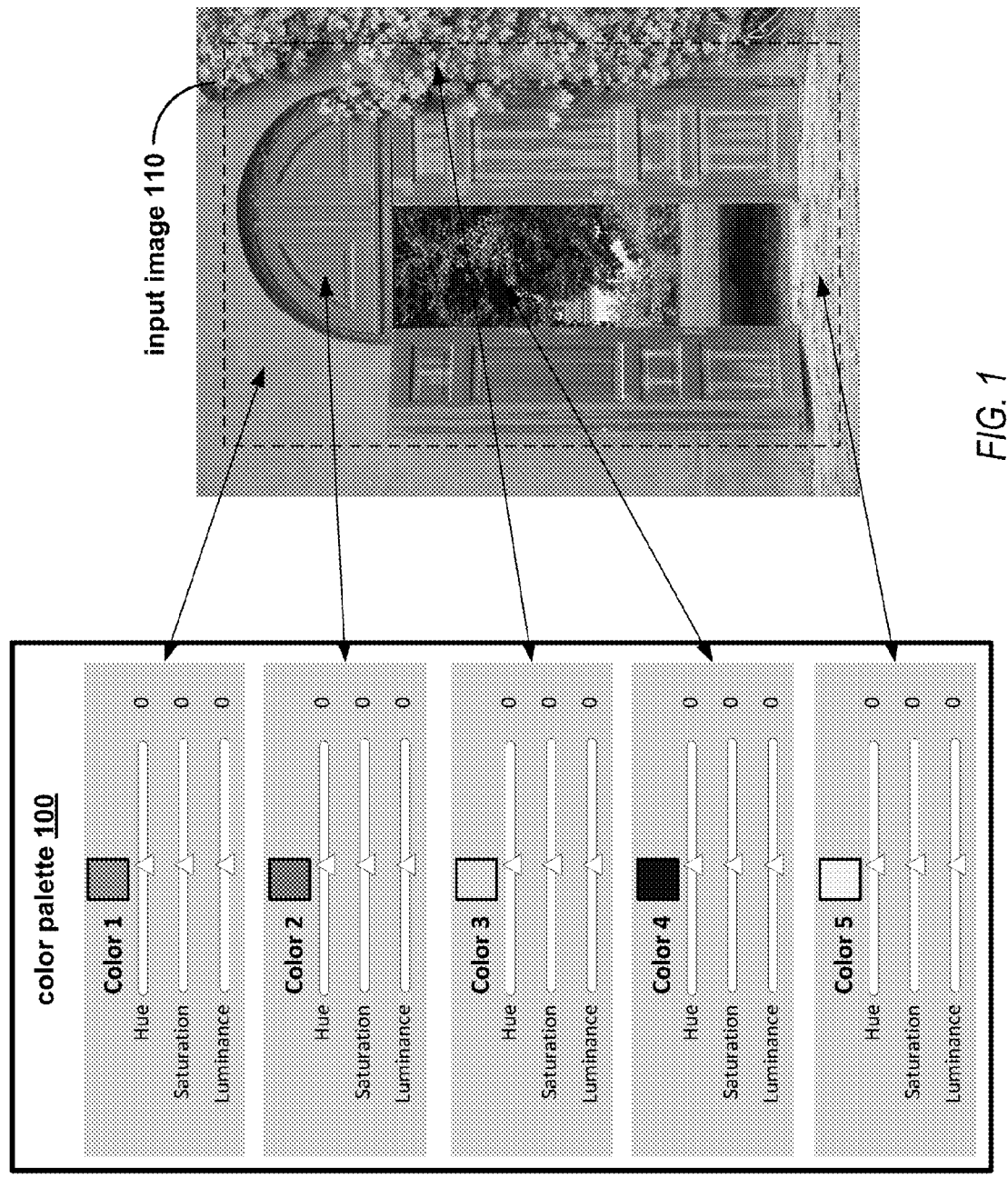
FIG. 1 shows an example of a color palette and input image according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods, apparatus, and non-transitory computer-readable storage media for editing images using color palettes are described. Embodiments may provide a color palette in which the colors presented to the user for editing are derived from the image itself, instead of being a predetermined set of standard colors as in conventional color palette techniques. Some embodiments may provide the color palette as or in a user interface that includes user interface elements that allow the user to directly modify colors present in the image through variables such as hue, saturation, luminance, or other attributes to achieve desired effects. FIG. 1 shows an example of a color palette, color palette 100, where the displayed colors are identified in input image 110 according to some embodiments, and is not intended to be limiting. In some embodiments the input image may be a specified object or region within a larger image, such as the enclosed area of the dotted rectangle in input image 110 in FIG. 1.

Figure 2:
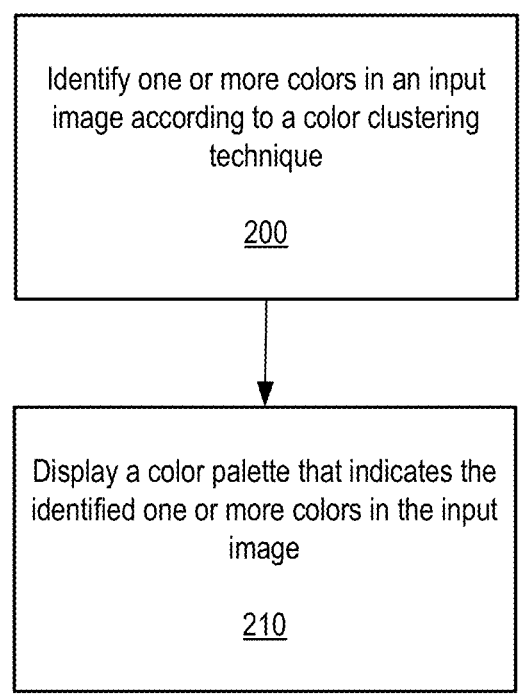
FIG. 2 is a flowchart of a method for editing images using a color palette interface according to at least some embodiments.

Various embodiments may provide a workflow that uses a color clustering technique to obtain a color palette. FIG. 2 describes one of these various embodiments. In 200, a color clustering technique decomposes the input image into clusters of pixels based on color. The distribution of pixels according to cluster allows that a pixel may belong to one or more clusters as determined by the respective color clustering technique. A color is identified in the image by its corresponding cluster of pixels. The colors displayed in 210 map to clusters of pixels generated by the color clustering technique in 200 providing an image-specific palette to the color palette interface. This allows for dominant colors, specific to the input image, to be displayed in the user interface, rather than conventional, fixed color palettes, because the color palette interface 210 presents to the user colors derived from the image that the user may wish to alter.

In some embodiments, a color clustering technique may provide an algorithm for fuzzy clustering of pixels in an image (e.g., a digital photograph) that is based on the assumption that pixels lie along rays in the image's three-dimensional color histogram. This assumption is based on the observation that when the pixels of many if not most images (for example, photographs of natural environments or scenes) are plotted on a color histogram, the pixels tend to lie (or cluster) along rays emanating from the origin (e.g., 0,0,0) of the 3D histogram. For example, the pixels in a brown object in the region will tend to be clustered about a particular ray that emanates from the origin. In at least some embodiments, a color clustering technique is performed by finding the cluster proxies which encode each ray's direction and the fuzzy coefficients which encode each pixel's degree of belonging to each cluster that minimize a given energy function.

Figure 3:
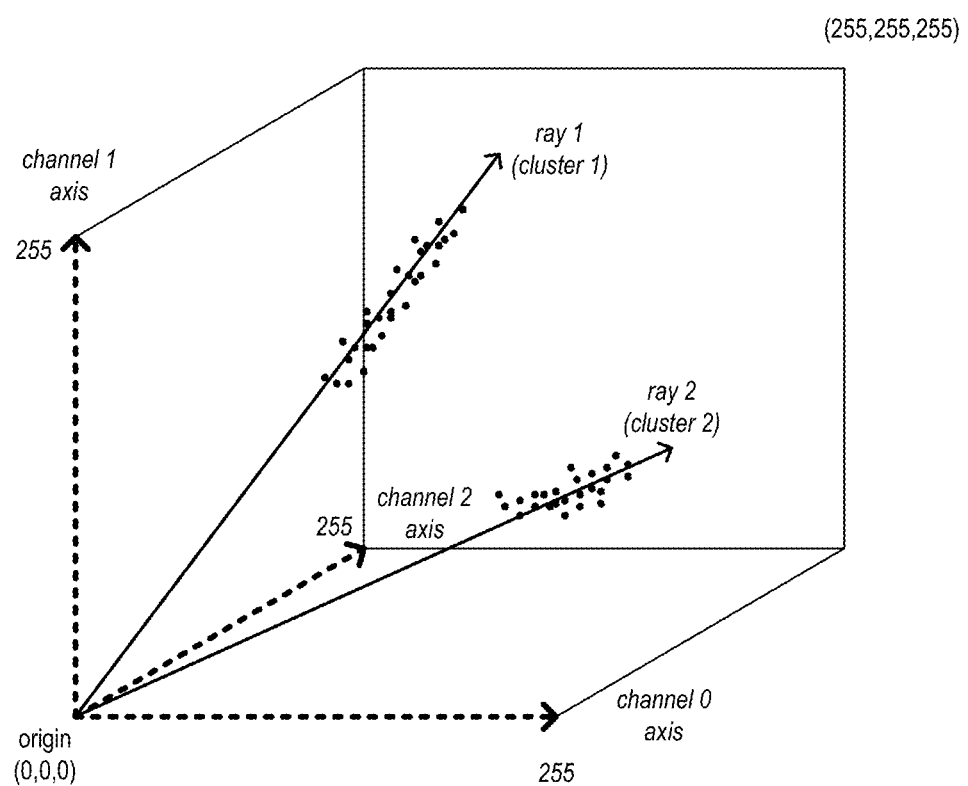
FIG. 3 graphically illustrates a 3D color histogram and shows example rays corresponding to clusters of pixels according to at least some embodiments.

FIG. 3 graphically illustrates a 3D color histogram and shows example rays corresponding to clusters of pixels, according to at least some embodiments. In this example, pixels have three color channels (e.g., red, green, and blue for RGB color space) with each channel having a range of [0, 255]. The histogram is generated by plotting all pixels in the image, or in a portion of the image, into the 3D space. Thus, each pixel in the image corresponds to a single 3D point in the histogram. Embodiments may identify N rays from the origin that best correspond to clusters of pixels in the histogram. A method for identifying these rays is described later in this document. This example shows two rays, ray 1 corresponding to a first cluster, and ray 2 corresponding to a second cluster.

The colors corresponding to clusters as identified by rays in the color histogram of the image are presented as a color palette to the user. FIG. 1 shows an example of color palette according to some embodiments, and is not intended to be limiting. In some embodiments, the colors displayed in the color palette interface are determined by computing the weighted average color of each cluster.

Once the user edits one of the colors displayed in the color palette, the clusters as identified by rays are used to map that change back to each pixel in the corresponding cluster. In some embodiments, this mapping is performed in such a manner as to keep the rays straight in the color histogram and preserve the structure of the image's histogram. In this manner, user edits may avoid generating artifacts, such as edge artifacts, and maintain a natural appearance in the image. Simply stated, when a color corresponding to a cluster is edited by the user, the corresponding ray is rotated while remaining anchored to the origin, and the pixels are then rotated according to the new position of the ray.

Various embodiments may provide a structure-preserving editing technique. This technique may include both a weighing scheme and a method for applying the edits using structure-preserving weights. This structure-preserving editing technique preserves the structure of color clustering within the image when applying the user's edits, thus eliminating undesirable blending artifacts along edges, for example.

Workflow

Figure 4:
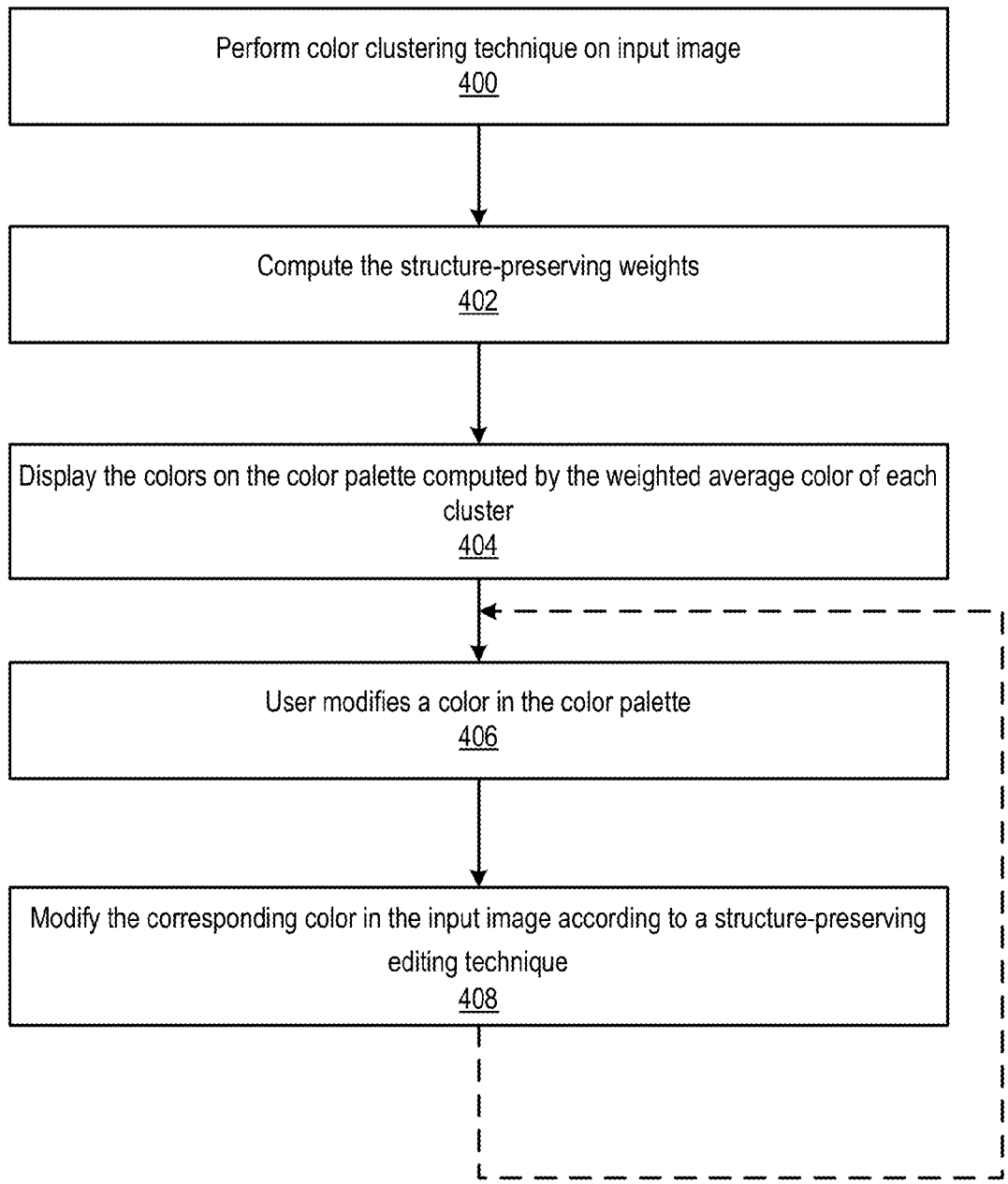
FIG. 4 is a flowchart of a method for editing images using a color palette interface according to some embodiments.

FIG. 4 is a flowchart of a method for editing images using color palette interfaces, according to at least some embodiments. As indicated at 400, clustering is performed on a target image, which may also include a specified object or region in the image. As indicated at 402, the structure-preserving weights are computed. As indicated at 404, the color palette is constructed by computing the weighted average color of each cluster. The palette is displayed on a user interface. FIG. 1 shows an example of a color palette according to some embodiments, and is not intended to be limiting. As indicated at 406, a user may edit the palette, for example by manipulating one or more user interface elements such as slider bars. In response to the user input(s), as indicated at 408, the corresponding color in the input image is modified according to a structure preserving editing technique. As indicated by the dashed arrow, elements 406 through 408 may be, but are not necessarily, repeated. Note that the displayed palette may be updated to reflect the user's edits.

In at least some embodiments, a color clustering technique may be performed using a fuzzy algorithm or technique based on rays, as described below. However, note that other methods or techniques may be used to perform clustering in some embodiments. For example, in some embodiments, a fuzzy C-means clustering technique may be used.

Further note that, in some embodiments, two or more sub-clusters, may be associated with a single ray. For example, an object in an image that is one color of varying brightness over some distance may be occluded in the middle by another object of a different color, resulting in a ray that includes a sub-cluster on each side of the occlusion. Some embodiments may thus provide a technique for identifying and displaying on the palette these sub-clusters.

In at least some embodiments, a structure-preserving editing technique may be performed using a technique based on preserving the location of a pixel on the plane defined by two clusters, as described below. However, note that other methods or techniques may be used to preserve the structure of the clusters in the histogram.

Color Clustering Technique

In at least some embodiments, a color clustering technique may be performed using a fuzzy algorithm based on rays, a variant in the fuzzy clustering algorithm family in which an assumption is that clusters are rays emanating from the origin of the 3D color histogram. Each cluster may be represented by its direction as a unit vector $c_i$. The distance between a pixel $x_j$ and cluster $c_i$ is:

$$d_{ij}^2 = \left\| x_j - \frac{c_i c_i^T x_j}{c_i^T c_i} \right\|^2$$

Cluster algorithms require an objective function that contains criteria to quantify the goodness of cluster models. The objective function serves as a cost function that is optimized to ascertain optimal clusters. In at least some embodiments, the objective function is the total energy, defined as:

$$E = \sum_{i=1}^{K} \sum_{j=1}^{N} \mu_{ij}^m d_{ij}^2$$

where K is the number of clusters (which may be specified by the user), N is the number of pixels, m>1 is a parameter that modulates fuzziness. In at least some embodiments m=2; however, other values may be used in other embodiments. In at least some embodiments, the fuzzy weights $\mu_{ij}$ may follow the following definition:

$$\mu_{ij} \left[ \sum_{t=1}^{K} \left( \frac{d_{ij}^2}{d_{tj}^2} \right)^{\frac{1}{m-1}} \right]^{-1}$$

The total energy E is minimized subject to K constraints:

$$c_i^T c_i = 1$$

which means that the cluster rays may be unit vectors. Assuming that this constraint always holds, the pixel-cluster distance above can be simplified to $$d_{ij}^2 = \| x_j - c_i c_i^T x_j \|^2$$

In at least some embodiments, optimization of the objective function to ascertain optimal clusters may be performed according to the following technique. Note that steps 2 through 4 are iteratively performed until a set of clusters is found for which total energy E has been minimized.

1. Randomize $c_i$ vectors.
2. Compute $\mu_{ij}$ based on $c_i$.
3. Minimize E as a function of $c_i$, taking $\mu_{ij}$ as constants.
4. Go back to step 2 unless $c_i$ are all stable.

The optimization problem at step 3 in the above is convex. The Karush-Kuhn-Tucker (KKT) condition yields:

$$2c_i(\lambda_i I - H_i) = 0 \quad (1)$$

$$c_i^T c_i = 1 \quad (2)$$

where $\lambda_i$ is the Lagrange multiplier for the i-th constraint, and:

$$H_i = \sum_{j=1}^{N} \mu_{ij}^m x_j x_j^T$$

Equation (1) above is an eigenvalue problem for $c_i$. Since matrix $H_i$ is symmetric and positive semi-definite, all of its eigenvalues are non-negative. At least some embodiments may take the eigenvector corresponding to the smallest eigenvalue and normalize it (to satisfy equation 2).

The dimension of matrix $H_i$ is D×D, where D is the dimension of the data points. In at least some embodiments, D=3. Therefore, this eigenvalue problem can be solved efficiently with analytical forms.

Structure-preserving Editing

Figure 5:
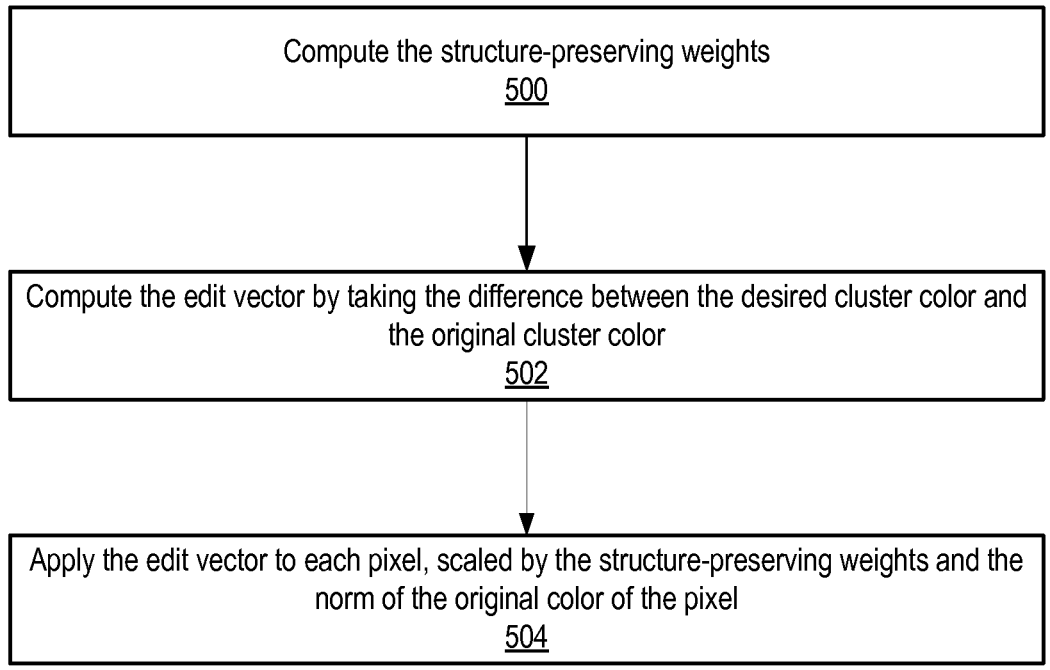
FIG. 5 is a flowchart of a method for applying a structure-preserving editing technique according to some embodiments.

In at least some embodiments, structure-preserving editing may be performed to preserve the shape of clusters in the histogram according to the technique exemplified in FIG. 5, which is not intended to be limiting. In some embodiments, the structure preserving weights $w_{ij}$ 500 may be computed as follows. For each cluster pair $(c_i, c_k)$, pixel color $x_i$ is projected onto the plane defined by $(c_i, c_k)$. The projection may be denoted as $x^p_j$, and it can be represented as a linear combination of $c_i$ and $c_j$:

$$x^p_j = s^{ik}_i c_i + s^{ik}_k c_k$$

Thus the weights for clusters $c_i$ and $c_k$ in plane $(c_i, c_k)$ are:

$$t^{ik}_i = \text{clamp}\left( \frac{s^{ik}_i}{s^{ik}_i + s^{ik}_k} \right)$$

$$t^{ik}_k = \text{clamp}\left( \frac{s^{ik}_k}{s^{ik}_i + s^{ik}_k} \right)$$

where clamp(x) clamps x into [0, 1]. The distance from $x_j$ to plane $(c_i, c_k)$ is:

$$d^{ik}_j = \|x_j - x^p_j\|$$

In at least some embodiments, in order to get the weight for cluster $c_i$, the interpolation factors $t^{ik}_i$ from all cluster pairs $(c_i, c_k)$ are averaged using the inverse of pixel-plane distances as weights, and then normalized so that the weights for each pixel add up to one:

$$w_{ij} = \frac{\sum_{k \neq i} \frac{t^{ik}_i}{d^{ik}_i}}{\sum_{l=0}^{K} \sum_{k \neq l} \frac{t^{lk}_l}{d^{lk}_l}}$$

After computing these structure-preserving weights, in some embodiments an edit vector may be computed 502. In at least some embodiments the edit vector is the difference between the desired cluster corresponding to a color determined by the user initiated color modification in the color palette and the cluster corresponding to the original color displayed in the color palette.

In some embodiments, structure preserving edits 504 may be applied as follows:

$$x_j^{out} = x_j^{in} + w_{ij} \|x_j^{in}\| e_i$$

where $e_i$ is the edit vector for cluster i. Since the edit vector is scaled by the norm of the original color of the pixel, the cluster maintains its shape relative to the origin after editing.

Because of the way the editing weights $w_{ij}$ are computed, the pixels lying on the plane of two clusters $(c_i, c_k)$ will only have non-zero weights in clusters i and k, and zero weights in all other clusters. A consequence of this is that, when cluster i or cluster k is edited, these pixels will remain on the new plane. This may help to avoid blending artifacts along the edges.

Example Implementations

FIG. 1 shows an example of a color palette according to some embodiments, and is not intended to be limiting. Color palette 100 may display one or more colors corresponding to colors identified from the input image 110, which may include a specified object or region in the input image. This example shows six colors labeled as colors 1 through 5. The colors are selected from a region within the input image outlined by the dotted line. The user may modify or edit one or more of the colors by interacting with one or more of the controls associated with each color. In this example, each color may be edited by adjusting a hue, saturation, and/or luminance control associated with the color. In this example, the controls are shown as slider bars. Note that other types of controls may be used in some embodiments to edit colors/clusters, e.g. dials, numeric entry boxes, popup menus, color wheels, and so on.

In at least some embodiments, when a user adjusts one of the controls for one of the clusters, the edit may be immediately applied to the image to provide immediate feedback to the user. In addition, a user interface element displaying an approximation of a color corresponding to the identified color may be displayed on color palette 100, and that color may be adjusted according to the edit to provide feedback to the user. Alternatively, the user may adjust one or more of the controls for one or more of the colors and then select an "apply changes" or similar user interface element (not shown) to apply the specified changes. Some embodiments may also include an "undo" or similar user interface element that allows the user to undo one or more previously applied edits (not shown).

Figure 6:
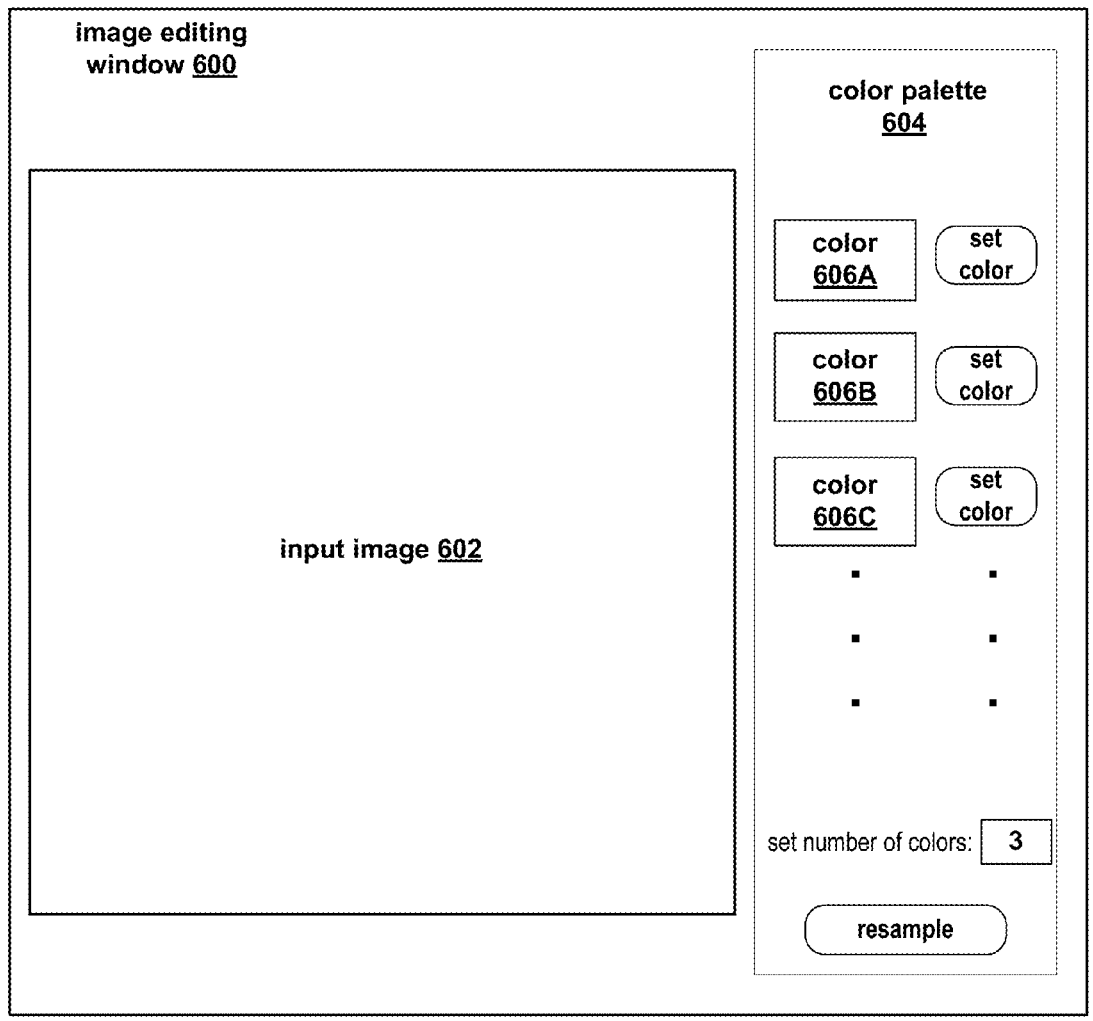
FIG. 6 shows an example of an image editing window of an image editing application that includes a color palette according to some embodiments.

FIG. 6 shows an example of an image editing window of an image editing application that includes a color palette according to some embodiments, and is not intended to be limiting. Image editing window 600 may display an input image 602, and may include a color palette 604 as described herein. As shown in FIG. 6, in some embodiments, the user may be allowed to specify how many colors are to be identified in the input image 602, for example via a "set number of colors" user interface element. For example, the user may request that two, three, four, or more colors be identified, up to some specified limit. In this example, the user has specified three colors. For each color, one or more user interface elements for editing the color may be displayed in a corresponding color 606 area of color palette 604. In this example, there are three clusters 606A through 606C. Changing the number of colors may automatically cause the method to generate a new set of clusters according to a color clustering technique. Alternatively, the color palette 604 may include a "resample" or similar user interface element that the user may select to cause the method to generate a new set of clusters.

In some embodiments, the user may be allowed to specify a color for one or more of the clusters. For example, the color palette 604 may include a "set color" or similar user interface element via which the user may specify a point or region in the input image 602 the color of which is to be used for the corresponding color 406. A user's selection of an input color may cause the method to automatically identify a cluster corresponding to the user specified color. Other methods may be used to specify a color in some embodiments. Specifying a color may automatically cause the method to generate a new set of clusters including a cluster corresponding to the specified color. Alternatively, the color palette 604 may include a "resample" or similar user interface element that the user may select to cause the method to generate a new set of clusters including a cluster corresponding to the specified color.

Embodiments of the color palette and image editing techniques as described herein may be used in any image editing or image processing application. Examples of applications in which embodiments may be used include, but are not limited to, Adobe® Photoshop® and Adobe® Photoshop® Lightroom®. "Adobe", "Photoshop", and "Lightroom" are either registered trademarks or trademarks of Adobe Systems Incorporated in the United States and/or other countries. An example module that may implement the color palette is illustrated in FIG. 4. An example system on which such a module may be implemented is illustrated in FIG. 6.

Some embodiments may include a means for image editing using a color palette as described herein. For example, a color palette module may implement an embodiment of a method for editing an image using a color palette as described herein, for example in reference to FIG. 4. The module may in some embodiments be implemented by a non-transitory computer-readable storage medium and one or more processors (e.g., CPUs and/or GPUs) of a computing apparatus. The computer-readable storage medium may store program instructions executable by the one or more processors to cause the computing apparatus to perform a method for editing an image using a color palette as described herein, for example in reference to FIG. 4. Other embodiments of the module may be at least partially implemented by hardware circuitry and/or firmware stored, for example, in a non-volatile memory.

Figure 7:
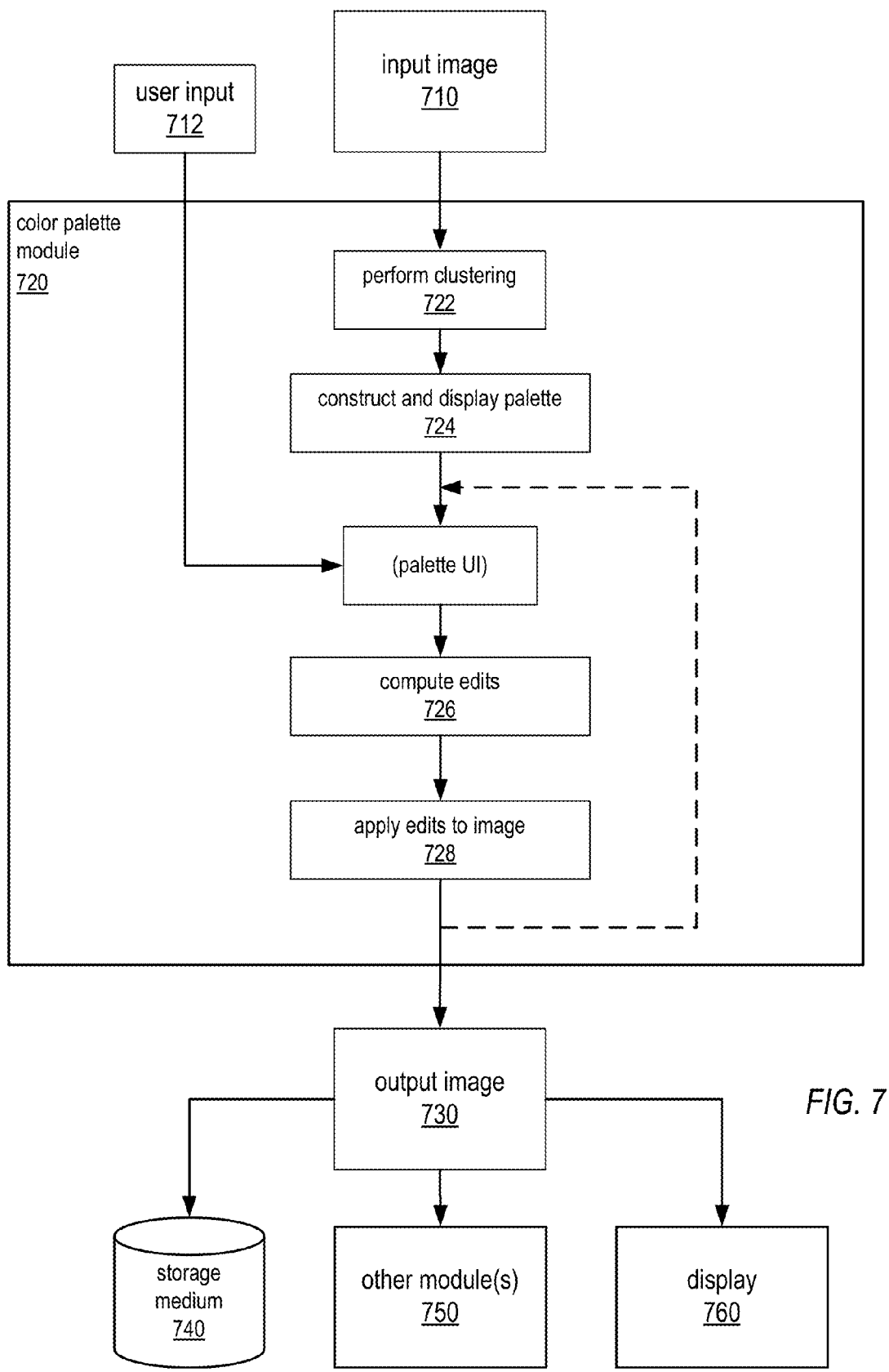
FIG. 7 illustrates a color palette module that may implement a method for editing images using a color palette as described herein, for example as illustrated in FIGS. 1 through 6.
Figure 8:
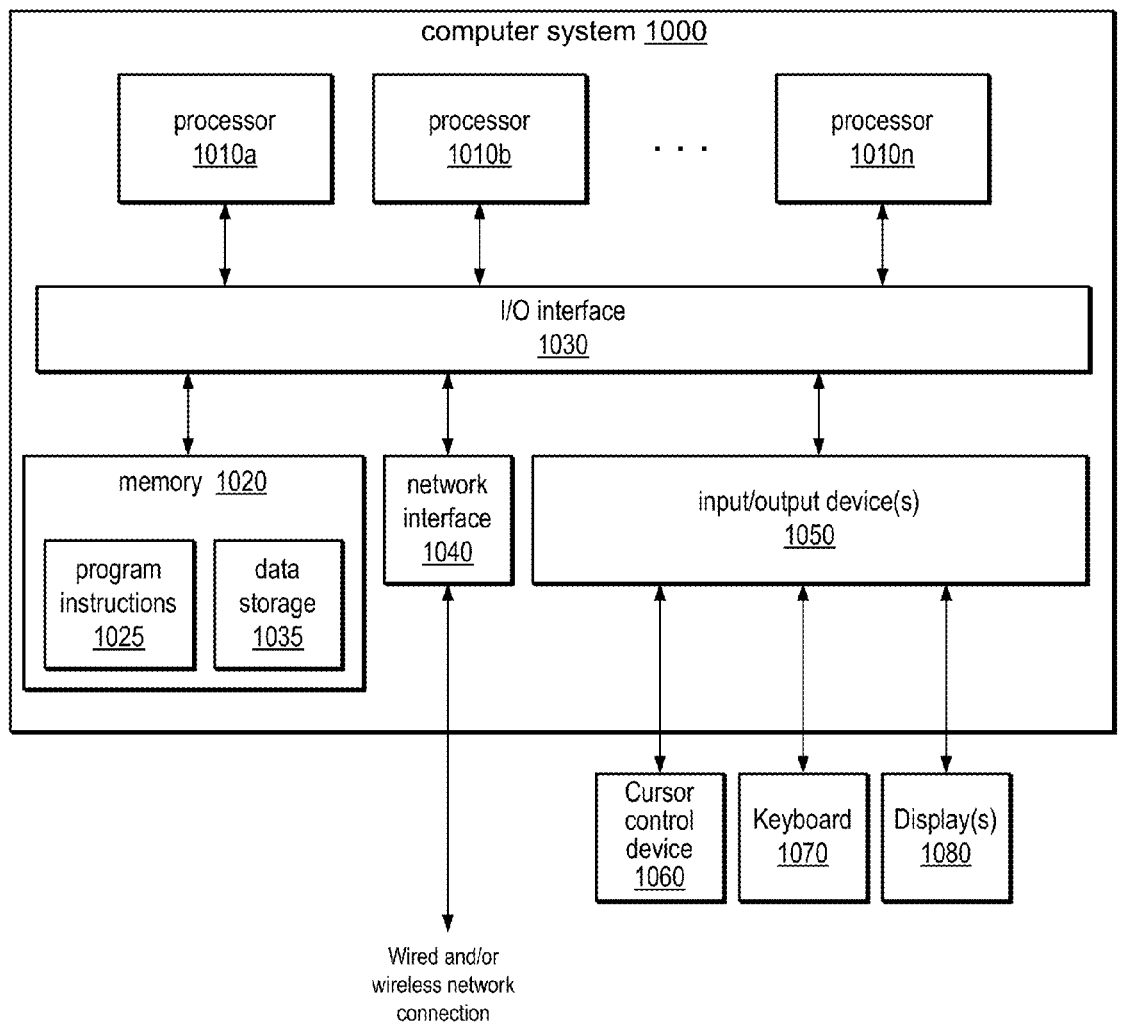
FIG. 8 illustrates an example computer system that may be used in embodiments.

FIG. 7 illustrates a color palette module that may implement a method for editing an image using a color palette as described herein, for example as illustrated in FIGS. 1 through 6. Module 720 obtains as input an image 710 and user input 712, for example user input adjusting one or more controls for one or more clusters identified for the image that are displayed on a palette user interface (UI), or in some embodiments input specifying a number of colors to be identified and/or a particular color to be clustered. Color palette module 720 may, for example, implement submodules for performing clustering 722 for an input image 710, constructing and displaying a palette 724 to a palette user interface (UI), obtaining and processing user input(s) 712 to the palette UI, computing edits 726 according to the user input(s), and applying the edits to the image. The module 720 may generate as output an output image 730 with colors modified according to the user input to the palette UI. Output image 730 may, for example, be stored to a storage medium 740, such as system memory, a disk drive, DVD, CD, etc., displayed on a display 760, and/or passed to one or more other modules 750 for further image processing. FIG. 8 illustrates an example computer system on which embodiments of module 720 may be implemented.

Example System

Embodiments of the method for constructing, displaying, and applying an image-specific editable color palette as described herein may be executed on one or more computer systems, which may interact with various other devices. One such computer system is illustrated by FIG. 6. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the method for constructing, displaying, and applying an image-specific editable color palette as described herein are shown stored within system memory 1020 as program instructions 1025 and data storage 1035, respectively. In other embodiments, program instructions and/or data may be obtained, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, configured to implement embodiments of the method for constructing, displaying, and applying an image-specific editable color palette as described herein, and data storage 1035, comprising various data accessible by program instructions 1025. In one embodiment, program instructions 1025 may include software elements of embodiments of the method for editing an image using a color palette interface as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the method for editing an image using a color palette interface as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include obtaining, sending or storing instructions and/or data implemented in accordance with the foregoing description upon a computer-accessible medium. Accordingly, the present invention may be practiced with other computer system configurations.

Conclusion

Various embodiments may further include obtaining, sending or storing instructions and/or data implemented in accordance with the foregoing description upon a non-transitory computer-accessible medium. Generally speaking, a non-transitory computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
   performing an image editing operation by one or more computing devices, the image editing operation comprising:
   obtaining an input image;
   decomposing the input image into a single three dimensional color histogram comprising pixel locations according to color, each pixel location in the single three dimensional color histogram representing a pixel in the input image;
   creating clusters of pixel locations based on color in the single three dimensional color histogram according to a color clustering technique;
   identifying one or more colors in the single three dimensional color histogram according to the clusters;
   displaying a color palette comprising one or more palette colors obtained at least in part using the identified one or more colors from the clustering technique and one or more controls corresponding to each of the one or more palette colors, each control operable to modify the respective color in the input image associated with the respective palette color;
   obtaining an input modifying a palette color;
   performing a structure-preserving editing technique that modifies the color of the clusters corresponding to the palette color in the single three dimensional color histogram, the structure-preserving editing technique maintaining a structure of the clusters in the input image;

modifying colors in the input image based on the changes to the single three dimensional color histogram; and displaying the modified input image.

2. The method as recited in claim 1, wherein said identifying one or more colors comprises identifying one or more rays in the single three dimensional color histogram, the rays each corresponding to one of the clusters of pixel locations in the single three dimensional color histogram, wherein the rays emanate from the origin of the single three dimensional color histogram and pass through a point in the corresponding cluster of pixel locations in the single three dimensional color histogram.

3. The method as recited in claim 2, wherein said identifying one or more colors comprises computing a weighted average color of each cluster corresponding to each of the one or more rays.

4. The method as recited in claim 2, further comprising, in response to input to one of the controls, modifying the single three dimensional color histogram by rotating one or more of the rays, the rotation rotating pixels in the corresponding cluster according to the rotated ray.

5. The method as recited in claim 1, further comprising:
obtaining input selecting a color from a set of colors corresponding to respective clusters; and
modifying a color palette interface to indicate the selected color.

6. The method as recited in claim 1, further comprising obtaining input specifying a number of palette colors to be included in the color palette, wherein said identifying of one or more colors is restricted to the specified number of palette colors.

7. A system, comprising:
at least one processor; and
a memory comprising program instructions, the program instructions being executable by the at least one processor to perform operations comprising:
obtaining an input image;
decomposing the input image into a single three dimensional color histogram comprising pixel locations according to color, each pixel location in the single three dimensional color histogram representing a pixel in the input image;
creating clusters of pixel locations based on color in the single three dimensional color histogram according to a color clustering technique;
identifying one or more colors in the single three dimensional color histogram according to the clusters;
displaying a color palette interface comprising one or more palette colors obtained at least in part using the identified one or more colors from the clustering technique and one or more controls corresponding to each of the one or more palette colors, each control operable to modify the respective color in the input image associated with the respective palette color;
obtaining input modifying a palette color;
performing a structure-preserving editing technique that modifies the color of the corresponding clusters in the single three dimensional color histogram;
modifying the input image based on the modified single three dimensional color histogram; and
displaying the modified input image.

8. The system as recited in claim 7, wherein the identifying one or more colors comprises identifying one or more rays in the single three dimensional color histogram, the rays each corresponding to one of the clusters of pixel locations in the single three dimensional color histogram, wherein the rays emanate from the origin of the single three dimensional color histogram and pass through a point in the corresponding cluster of pixel locations in the single three dimensional color histogram.

9. The system as recited in claim 8, wherein the operations further comprise, in response to input to one of the controls, modifying the respective color in the image by rotating the corresponding ray in the single three dimensional color histogram and rotating pixels in the corresponding cluster according to the rotated ray.

10. The system as recited in claim 7, wherein the operations further comprise:
obtaining input specifying a color, the specified color corresponding to a respective cluster of one of the clusters; and
modifying the color palette to indicate the specified color.

11. The system as recited in claim 7, wherein the operations further comprise obtaining input specifying a number of colors to be included in the color palette and wherein the identifying one or more colors is restricted to the specified number of colors.

12. A non-transitory computer-readable storage medium, storing program instructions, the program instructions being computer-executable to implement operations comprising:
obtaining an input image;
decomposing the input image into a single three dimensional color histogram comprising pixel locations according to color, each pixel location in the single three dimensional color histogram representing a pixel in the input image;
creating clusters of pixel locations based on color in the single three dimensional color histogram according to a color clustering technique;
identifying one or more colors in the single three dimensional color histogram according to the clusters;
displaying a color palette comprising one or more palette colors obtained at least in part using the identified one or more colors from the clustering technique and one or more controls corresponding to each of the one or more palette colors, each control operable to modify the respective color in the input image associated with the respective palette color;
obtaining input modifying a palette color;
performing a structure-preserving editing technique that modifies the color of the corresponding clusters in the single three dimensional color histogram;
modifying the input image based on the modified single three dimensional color histogram; and
displaying the modified input image.

13. The non-transitory computer-readable storage medium as recited in claim 12, wherein the identifying one or more colors comprises identifying one or more rays in the single three dimensional color histogram, the rays each corresponding to one of the clusters of pixel locations in the single three dimensional color histogram, wherein the rays emanate from the origin of the single three dimensional color histogram and pass through a point in the corresponding cluster of pixel locations in the single three dimensional color histogram.

14. The non-transitory computer readable storage medium as recited in claim 13, wherein the operations further comprise, in response to input to one of the controls, modifying the respective color in the image by rotating the corresponding ray in the single three dimensional color histogram and rotating pixels in the corresponding cluster according to the rotated ray.

15. The non-transitory computer-readable storage medium as recited in claim 12, wherein the operations further comprise:
   obtaining input specifying a color from a plurality of colors corresponding to respective clusters from the clustering technique; and
   modifying the color palette to indicate the specified color.

16. The non-transitory computer-readable storage medium as recited in claim 12, wherein the operations further comprise obtaining input specifying a number of colors to be included in the color palette and wherein, said identifying the one or more colors is restricted to the specified number of colors.

* * * * *